US010108209B2

(12) United States Patent
Ideno et al.

(10) Patent No.: US 10,108,209 B2
(45) Date of Patent: Oct. 23, 2018

(54) SEMICONDUCTOR INTEGRATED CIRCUIT WITH A REGULATOR CIRCUIT PROVIDED BETWEEN AN INPUT TERMINAL AND AN OUTPUT TERMINAL THEREOF

(71) Applicant: TOSHIBA MEMORY CORPORATION, Minato-ku (JP)

(72) Inventors: Hiroyuki Ideno, Yokohama (JP); Hidefumi Kushibe, Kamakura (JP)

(73) Assignee: TOSHIBA MEMORY CORPORATION, Minato-ku (JP)

( * ) Notice: Subject to any disclaimer, the term of this patent is extended or adjusted under 35 U.S.C. 154(b) by 150 days.

(21) Appl. No.: 14/848,851

(22) Filed: Sep. 9, 2015

(65) Prior Publication Data

US 2016/0239029 A1 Aug. 18, 2016

Related U.S. Application Data

(60) Provisional application No. 62/115,887, filed on Feb. 13, 2015.

(51) Int. Cl.
*G05F 1/10* (2006.01)
*H02H 9/04* (2006.01)
*H02M 1/00* (2006.01)

(52) U.S. Cl.
CPC .............. *G05F 1/10* (2013.01); *H02H 9/04* (2013.01); *H02M 1/00* (2013.01)

(58) Field of Classification Search
CPC . G05F 1/10; G05F 1/565; G05F 1/575; G05F 1/56; G05F 1/467; H02H 9/04;
(Continued)

(56) References Cited

U.S. PATENT DOCUMENTS 5,387,880 A * 2/1995 Kobayashi .............. H03F 1/226
330/277
6,509,722 B2 * 1/2003 Lopata ................ H03F 3/45183
323/275
(Continued)

FOREIGN PATENT DOCUMENTS

JP 2005-157523 6/2005
JP 2007-11709 1/2007
(Continued)

*Primary Examiner* — Thienvu Tran
*Assistant Examiner* — Nicolas Bellido
(74) *Attorney, Agent, or Firm* — Oblon, McClelland, Maier & Neustadt, L.L.P.

(57) ABSTRACT

According to one embodiment, there is provided a semiconductor integrated circuit including an output transistor, an error amplifier, and a control circuit. The output transistor is connected between a first node on an input terminal side and a second node on an output terminal side. The error amplifier has a non-inverting input terminal, an inverting input terminal, and an output terminal. The non-inverting input terminal is connected to a third node between the second node and a standard potential. The inverting input terminal is connected to a reference voltage. The output terminal is connected to the gate of the output transistor. The control circuit makes responsiveness of the error amplifier at startup slower than responsiveness of the error amplifier at steady operation.

17 Claims, 11 Drawing Sheets

(58) Field of Classification Search
CPC ........... G06F 2203/04107; G06F 3/041; G06F
3/0416; H03K 19/0175; H03K 19/003;
H01L 27/04; H01L 21/822; H01L 21/70;
H01L 27/146–27/14656; H01L 27/06;
H01L 21/8238; H01L 27/092; Y10T
307/707; Y10T 307/305; Y10T 307/858;
G11C 5/147; G11C 5/14
USPC ........................................................ 361/261
See application file for complete search history.

(56) References Cited

U.S. PATENT DOCUMENTS

| 7,071,667 | B2 * | 7/2006 | Itohara | H02M 3/156 |
| | | | | 323/222 |
| 7,622,901 | B2 * | 11/2009 | Noda | G05F 1/565 |
| | | | | 307/130 |
| 8,098,057 | B2 * | 1/2012 | Morino | G05F 1/56 |
| | | | | 323/269 |
| 8,289,009 | B1 * | 10/2012 | Strik | G05F 1/575 |
| | | | | 323/272 |
| 8,716,993 | B2 * | 5/2014 | Kadanka | G05F 1/56 |
| | | | | 323/274 |
| 9,740,223 | B1 * | 8/2017 | Wang | G05F 1/56 |
| 2008/0316663 | A1 * | 12/2008 | Martin | H01L 27/0285 |
| | | | | 361/56 |
| 2012/0013396 | A1 * | 1/2012 | Morino | G05F 3/24 |
| | | | | 327/540 |
| 2013/0200866 | A1 * | 8/2013 | Kushibe | G05F 1/565 |
| | | | | 323/275 |
| 2014/0266118 | A1 * | 9/2014 | Chern | H02M 3/156 |
| | | | | 323/283 |
| 2014/0269136 | A1 * | 9/2014 | Kamiya | G11C 5/14 |
| | | | | 365/226 |
| 2015/0293547 | A1 * | 10/2015 | Tanaka | G05F 1/561 |
| | | | | 323/273 |
| 2017/0264196 | A1 * | 9/2017 | Ideno | H02M 3/158 |

FOREIGN PATENT DOCUMENTS

| JP | 2007-280025 | 10/2007 |
| JP | 2014-182487 | 9/2014 |

* cited by examiner

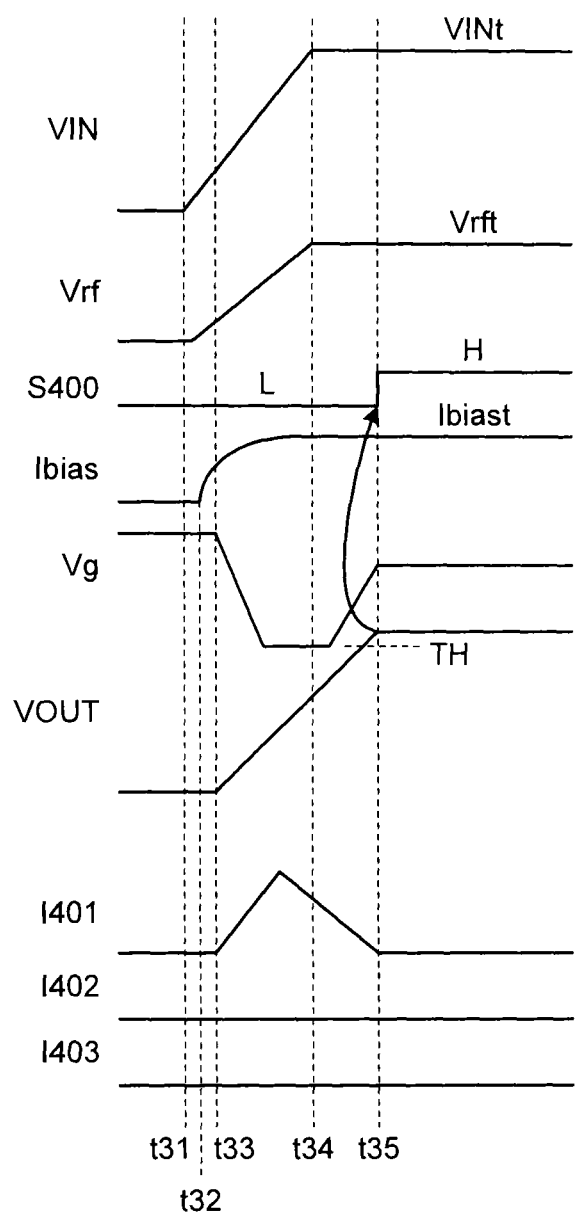

SEMICONDUCTOR INTEGRATED CIRCUIT WITH A REGULATOR CIRCUIT PROVIDED BETWEEN AN INPUT TERMINAL AND AN OUTPUT TERMINAL THEREOF

CROSS-REFERENCE TO RELATED APPLICATIONS

This application is based upon and claims the benefit of priority from U.S. Provisional Application No. 62/115,887, filed on Feb. 13, 2015 the entire contents of which are incorporated herein by reference.

FIELD

Embodiments described herein relate generally to a semiconductor integrated circuit.

BACKGROUND

In a regulator circuit provided between an input terminal and an output terminal, at startup, an output transistor is turned on so that the path between the input terminal and the output terminal is rendered conductive. Here, it is desired to suppress rush current flowing through the output transistor and out into the output terminal side.

BRIEF DESCRIPTION OF THE DRAWINGS

FIG. 11 is a waveform diagram showing the operation of the semiconductor integrated circuit according to the fourth embodiment.

DETAILED DESCRIPTION

In general, according to one embodiment, there is provided a semiconductor integrated circuit including an output transistor, an error amplifier, and a control circuit. The output transistor is connected between a first node on an input terminal side and a second node on an output terminal side. The error amplifier has a non-inverting input terminal, an inverting input terminal, and an output terminal. The non-inverting input terminal is connected to a third node between the second node and a standard potential. The inverting input terminal is connected to a reference voltage. The output terminal is connected to the gate of the output transistor. The control circuit makes responsiveness of the error amplifier at startup slower than responsiveness of the error amplifier at steady operation.

Exemplary embodiments of a semiconductor integrated circuit will be explained below in detail with reference to the accompanying drawings. The present invention is not limited to the following embodiments.

First Embodiment

Figure 1:
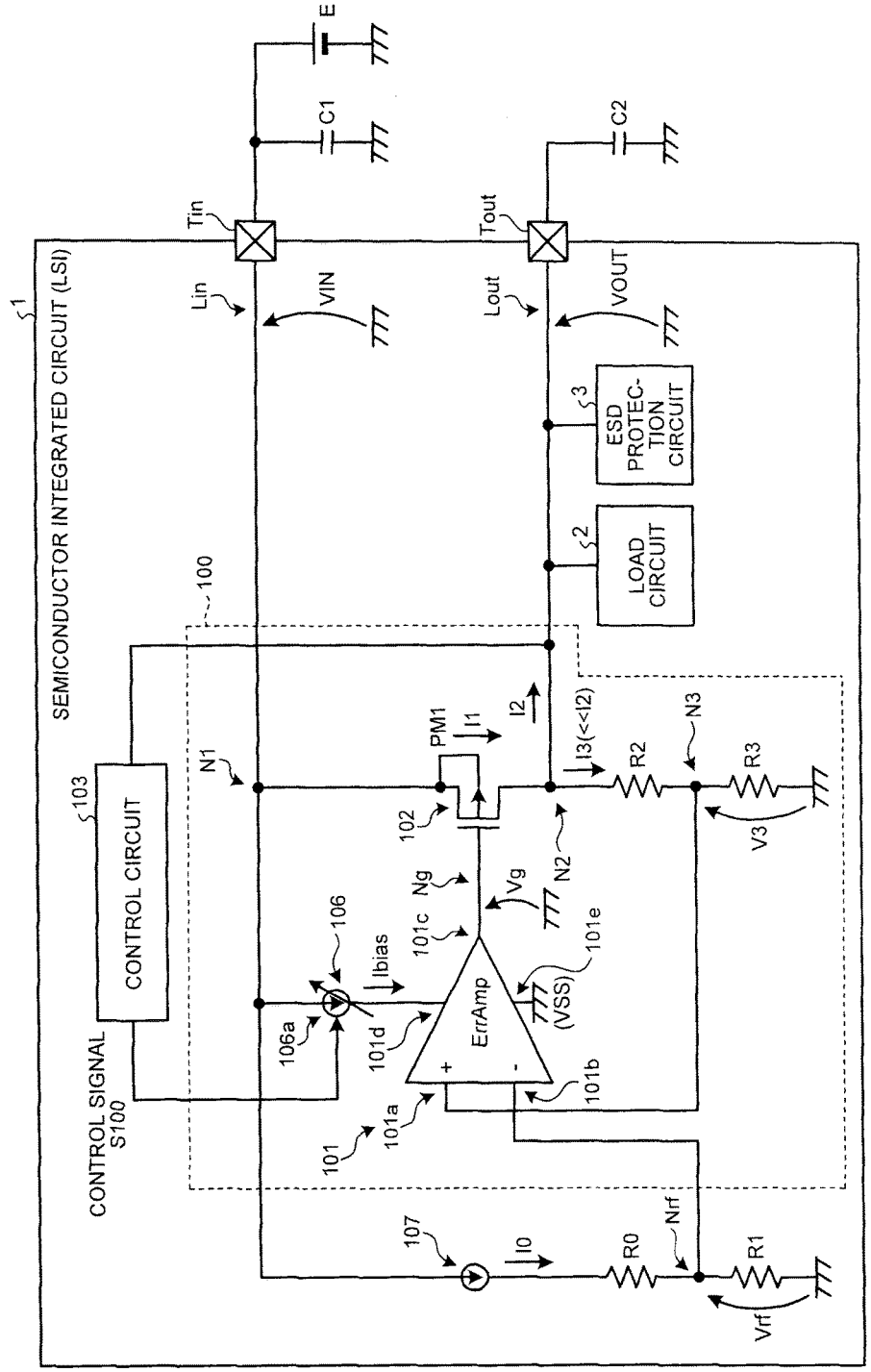
FIG. 1 is a circuit diagram showing the configuration of a semiconductor integrated circuit according to a first embodiment.

A semiconductor integrated circuit 1 according to the first embodiment will be described using FIG. 1. FIG. 1 is a circuit diagram showing the configuration of the semiconductor integrated circuit 1.

The semiconductor integrated circuit 1 has a regulator circuit 100 incorporated therein. The regulator circuit 100 is provided between an input terminal Tin and an output terminal Tout of the semiconductor integrated circuit 1. In the semiconductor integrated circuit 1, the input terminal Tin is connected to the regulator circuit 100 via an input line Lin. A capacitance element C1 is externally connected to the input terminal Tin to stabilize a voltage VIN on the input line Lin. The voltage VIN on the input line Lin can also be referred to as the voltage VIN on the input terminal Tin. At the startup of the regulator circuit 100, a power supply E is connected to the input terminal Tin.

In the semiconductor integrated circuit 1, the output terminal Tout is connected to the regulator circuit 100 via an output line Lout. A capacitance element C2 is externally connected to the output terminal Tout to stabilize a voltage VOUT on the output line Lout. The voltage VOUT on the output line Lout can also be referred to as the voltage VOUT on the output terminal Tout. A load circuit 2 is connected to the output line Lout. The load circuit 2 is, for example, a logic circuit.

When at startup the power supply E is connected to the input terminal Tin, the regulator circuit 100 generates an internal power supply voltage (voltage VOUT) from the voltage VIN on the input line Lin and supplies the generated internal power supply voltage to the load circuit 2.

In the semiconductor integrated circuit 1, if an ESD (Electrostatic Discharge) occurs, a high voltage is externally applied thereto, so that the load circuit 2 may be damaged. Accordingly, an ESD protection circuit 3 is connected to the output line Lout so that, when a high voltage due to ESD is applied, the ESD protection circuit 3 is turned on to secure an ESD electric discharge path so as to protect the load circuit 2.

The ESD protection circuit 3 is, for example, an RCT-MOS-type ESD protection circuit. The ESD protection circuit 3 is designed to operate if the rise gradient of the voltage VOUT on the output line Lout is steep.

The semiconductor integrated circuit 1 has the regulator circuit 100, a control circuit 103, a constant current source 107, and resistance elements R0, R1. The regulator circuit 100 has an output transistor 102, an error amplifier 101, a variable current source 106, and resistance elements R2, R3.

The output transistor 102 is connected between a node N1 and a node N2. The node N1 is a node on the input terminal Tin side and is connected to the input terminal Tin via the input line Lin. The node N2 is a node on the output terminal Tout side and is connected to the output terminal Tout via the output line Lout. At the startup of the regulator circuit 100, the output transistor 102 is turned on to render the path between the node N1 and the node N2 conductive.

The output transistor 102 has a PMOS transistor PM1. The PMOS transistor PM1 has its source connected to the node N1, its drain connected to the node N2, and its gate connected to the node Ng. The node Ng is a node on the error amplifier 101 side and is connected to the output terminal 101c of the error amplifier 101.

The error amplifier 101 has a non-inverting input terminal 101a, an inverting input terminal 101b, an output terminal 101c, a bias terminal 101d, and a standard potential terminal 101e. The non-inverting input terminal 101a is connected to a node N3. The node N3 is a node between the node N2 and a standard potential (e.g., ground potential). The node N3 is connected to the node N2 via the resistance element R2 and connected to the standard potential via the resistance element R3. Most current I2 of the drain current I1 of the PMOS transistor PM1 flows out through the output line Lout, and part I3 (<<I2) of the drain current I1 of the PMOS transistor PM1 flows through the resistance elements R2 and R3. A voltage V3 on the node N3 is produced by voltage division by the resistance elements R2 and R3.

The inverting input terminal 101b is connected to a reference node Nrf. The reference node Nrf is a node between the input line Lin and the standard potential (e.g., ground potential). The reference node Nrf is connected to the input line Lin via the resistance elements R0 and constant current source 107 and is connected to the standard potential via the resistance element R1. The constant current source 107 causes a current I0 to flow through the resistance elements R0 and R1. At this time, a reference voltage Vrf on the reference node Nrf is produced by the resistance element R1 and the current I0.

The output terminal 101c is connected to the node Ng. The node Ng is connected to the gate of the PMOS transistor PM1. The bias terminal 101d is connected to the variable current source 106. The standard potential terminal 101e is connected to the standard potential.

The error amplifier 101 controls the voltage Vg on the node Ng so that the difference between the voltage V3 on the node N3 and the reference voltage Vrf becomes substantially zero. That is, the error amplifier 101 feedback-controls the gate voltage of the PMOS transistor PM1 so that the voltage V3 on the node N3 approaches the reference voltage Vrf.

When the power supply E is connected to the input terminal Tin, so that the voltage VIN on the input line Lin keeps on increasing, the output transistor 102 is turned on, so that the regulator circuit 100 starts up. At this time, most current I2 of the drain current I1 of the output transistor 102 flows out through the output line Lout so as to charge the capacitance element C2 with electric charges, causing the voltage VOUT on the output line Lout to increase.

At this time, the voltage VOUT on the output line Lout rises with a gradient depending on the rise gradient of the voltage VIN on the input line Lin or that of the reference voltage Vrf. The rise gradient of the voltage VOUT on the output line Lout may be steep depending on the rise gradient of the voltage VIN on the input line Lin or that of the reference voltage Vrf. If the rise gradient of the voltage VOUT on the output line Lout is steep, then the ESD protection circuit 3 turns on, so that rush current flowing through the output transistor 102 increases. The increased rush current causes a decrease in the voltage VIN on the input line Lin and a decrease in the voltage VOUT on the output line Lout. Further, because a current is shunted through the ESD protection circuit 3 into the standard potential, current supplied to the capacitance element C2 is likely to decrease, and thus the voltage VOUT on the output line Lout is less likely to increase. Thus, it is difficult to make the voltage VOUT on the output line Lout rise to a target voltage within a required time, and therefore the startup time from when the semiconductor integrated circuit 1 starts up to when it enters steady operation may be elongated.

Accordingly, in the present embodiment, the control circuit 103 makes the responsiveness of the error amplifier 101 at startup slower than that of the error amplifier 101 at steady operation.

Specifically, the control circuit 103 compares the voltage VOUT on the output terminal Tout and a threshold TH and controls the responsiveness to the voltage V3 on the node N3 of the error amplifier 101 according to the comparing result. The responsiveness of the error amplifier 101 is the ability of the error amplifier 101 to be responsive when it feedback-controls the gate voltage of the PMOS transistor PM1 so that the voltage V3 on the node N3 approaches the reference voltage Vrf. If the voltage VOUT on the output terminal Tout is less than or equal to the threshold TH, the control circuit 103 controls the responsiveness of the error amplifier 101 to be at first responsiveness. If the voltage VOUT on the output terminal Tout exceeds the threshold TH, the control circuit 103 controls the responsiveness of the error amplifier 101 to be at second responsiveness. The second responsiveness is faster than the first responsiveness.

For example, the control circuit 103 supplies a control signal S100 to a control terminal 106a of the variable current source 106, so that it can vary a bias current Ibias supplied from the variable current source 106 to the error amplifier 101. The control circuit 103 makes the bias current Ibias from the variable current source 106 to the error amplifier 101 at startup smaller than the bias current Ibias from the variable current source 106 to the error amplifier 101 at steady operation. When the control signal S100=0, the current value of the bias current Ibias is smaller than at steady operation. When the control signal S100=1, the bias current Ibias takes on the current value at steady operation. The control circuit 103 includes, for example, a comparator.

At the startup of the regulator circuit 100, the control circuit 103 makes the control signal S100 be at 0 to cause the bias current Ibias to take on a current value smaller than at steady operation, thereby rendering the responsiveness of the error amplifier 101 slower than at steady operation.

Figure 2:
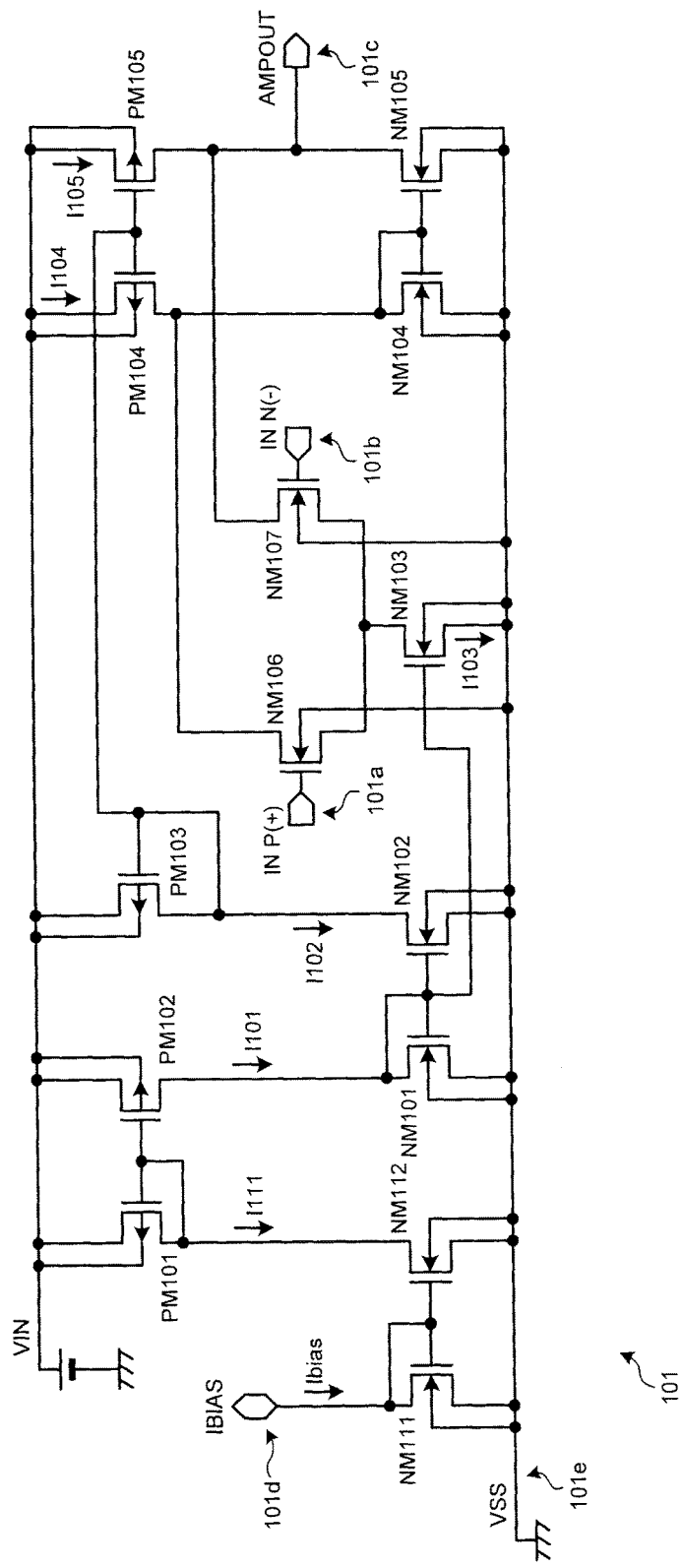
FIG. 2 is a circuit diagram showing the configuration of an error amplifier in the first embodiment.

For example, the error amplifier 101 has a configuration shown in FIG. 2. FIG. 2 is a circuit diagram showing the configuration of the error amplifier 101. The error amplifier 101 has PMOS transistors PM101 to PM105 and NMOS transistors NM101 to NM107, NM111, NM112. The responsiveness of the error amplifier 101 varies depending on, e.g., the drive capabilities of the NMOS transistor NM103 and PMOS transistors PM104, PM105. That is, the speed at which the voltage on the output terminal 101c changes according to the difference between the gate voltages of the NMOS transistors NM106 and NM107 varies depending on the drive capabilities of the NMOS transistor NM103 and PMOS transistors PM104, PM105. The drive capabilities of the NMOS transistor NM103 and PMOS transistors PM104, PM105 vary depending on bias voltages supplied to their gates.

The NMOS transistors NM111, NM112 constitute a current mirror circuit, and the bias current Ibias flowing in via the bias terminal 101d is copied as a bias current I111 to the NMOS transistor NM112 side at a predetermined mirror ratio. The PMOS transistors PM101, PM102 constitute a current mirror circuit, and the bias current I111 is copied as a bias current I101 to the PMOS transistor PM102 side at a predetermined mirror ratio. The NMOS transistors NM101, NM103 constitute a current mirror circuit, and the bias current I101 is copied as a bias current I103 to the NMOS transistor NM103 side at a predetermined mirror ratio. Here, the bias voltage supplied to the gate of NMOS transistor NM103 is adjusted.

The NMOS transistors NM101, NM102 constitute a current mirror circuit, and the bias current I101 is copied as a bias current I102 to the NMOS transistor NM102 side at a predetermined mirror ratio. The PMOS transistors PM103 to PM105 constitute current mirror circuits, and the bias current I102 is copied as bias currents I104, I105 respectively to the PMOS transistor PM104 side and the PM105 side at predetermined mirror ratios. Here, the bias voltage supplied to the gates of the PMOS transistors PM104, PM105 is adjusted.

By making the value of the bias current Ibias smaller, the drive capabilities of the NMOS transistor NM103 and PMOS transistors PM104, PM105 can be made smaller, so that the responsiveness of the error amplifier 101 can be made slower.

Figure 3:
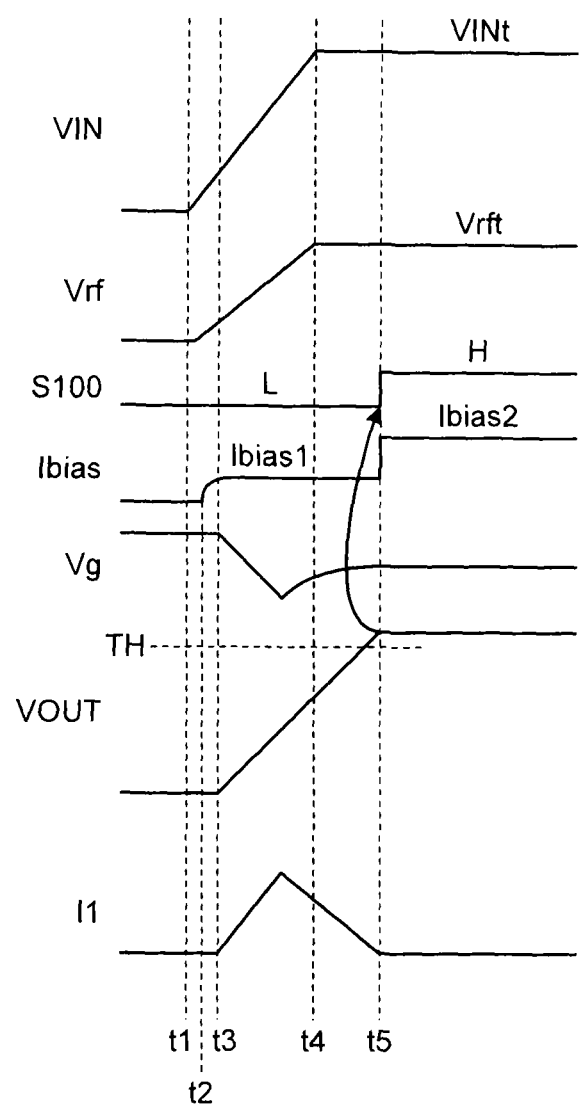
FIG. 3 is a waveform diagram showing the operation of the semiconductor integrated circuit according to the first embodiment.

For example, as shown in FIG. 3, the control circuit 103 makes the value Ibias1 of the bias current Ibias from the variable current source 106 to the error amplifier 101 at the startup of the regulator circuit 100 smaller than the value Ibias2 of the bias current Ibias from the variable current source 106 to the error amplifier 101 at steady operation. FIG. 3 is a waveform diagram showing the operation of the regulator circuit 100.

Immediately before timing t1, the control circuit 103 controls the control signal S100 for the variable current source 106 to be at a low (L) level (a bit value of 0).

At timing t1, the power supply E is connected to the input terminal Tin, so that the voltage VIN on the input line Lin starts rising. Accordingly, the reference voltage Vrf also starts rising.

At timing t2, in response to the voltage VIN on the input line Lin starting rising, the variable current source 106 starts operating.

At timing t3, the bias current Ibias supplied from the variable current source 106 to the error amplifier 101 becomes stable being at the value Ibias1. The value Ibias1 of the bias current Ibias is smaller than the value Ibias2 of the bias current Ibias at steady operation.

With this operation, the responsiveness of the error amplifier 101 becomes slower, so that the voltage Vg on the node Ng can be made to change (decrease) gently, and thus the output transistor 102 (PMOS transistor PM1) can be turned on slowly. The output transistor 102 turning on slowly causes the drain current I1 also to start flowing with a gentle gradient, and thus the voltage VOUT on the output line Lout can be raised with a gentle gradient, so that rush current can be suppressed.

Further, because the voltage VOUT on the output line Lout rises with a gentle gradient, the ESD protection circuit 3 can be prevented from turning on.

At timing t4, the voltage VIN on the input line Lin becomes stable being at a predetermined value VINt. Accordingly, the reference voltage Vrf becomes stable being at a predetermined value Vrft.

At timing t5, the control circuit 103 detects that the voltage VOUT on the output line Lout exceeds the threshold TH and controls the control signal S100 for the variable current source 106 to be at a high (H) level (a bit value of 1) based on the detecting result. Accordingly, the bias current Ibias supplied from the variable current source 106 to the error amplifier 101 increases from the value Ibias1 to the value Ibias2. Thus, the responsiveness of the error amplifier 101 becomes faster, and hence it is possible to make the performance of the regulator circuit 100 at steady operation satisfy a required level.

As described above, in the first embodiment, in the semiconductor integrated circuit 1, the control circuit 103 makes the responsiveness of the error amplifier 101 at startup slower than that of the error amplifier 101 at steady operation. Thus, the output transistor 102 can be made to turn on slowly at the startup of the regulator circuit 100, and thus the rise gradient of the voltage VOUT on the output line Lout can be made gentle, so that the ESD protection circuit 3 can be prevented from turning on. As a result, rush current flowing through the output transistor 102 at the startup of the regulator circuit 100 can be suppressed, and a decrease in current supplied to the capacitance element C2 can be suppressed. Therefore, it is easy to make the voltage VOUT on the output line Lout rise to a target voltage within a required time, and thus the startup time from when the semiconductor integrated circuit 1 starts up to when it enters steady operation can be easily shortened.

Further, in the first embodiment, in the semiconductor integrated circuit 1, the control circuit 103 makes the current supplied from the variable current source 106 to the error amplifier 101 at startup smaller than the current supplied from the variable current source 106 to the error amplifier 101 at steady operation. With this operation, the responsiveness of the error amplifier 101 at startup can be made slower than that of the error amplifier 101 at steady operation. Yet further, control to make the rise gradient of the voltage VOUT on the output line Lout gentle can be performed through simple control, so that the circuit area of an additional circuit for this control can be suppressed to a small amount.

Second Embodiment

Next, a semiconductor integrated circuit 201 according to the second embodiment will be described. Description will be made below focusing on the differences from the first embodiment.

Whereas in the first embodiment the rise gradient of the voltage VOUT on the output line Lout is made gentle at startup by making the responsiveness of the error amplifier 101 slower, in the second embodiment the rise gradient of the voltage VOUT on the output line Lout is made gentle at startup by making the circuit resistance between the node N1 and the node N2 higher.

Figure 4:
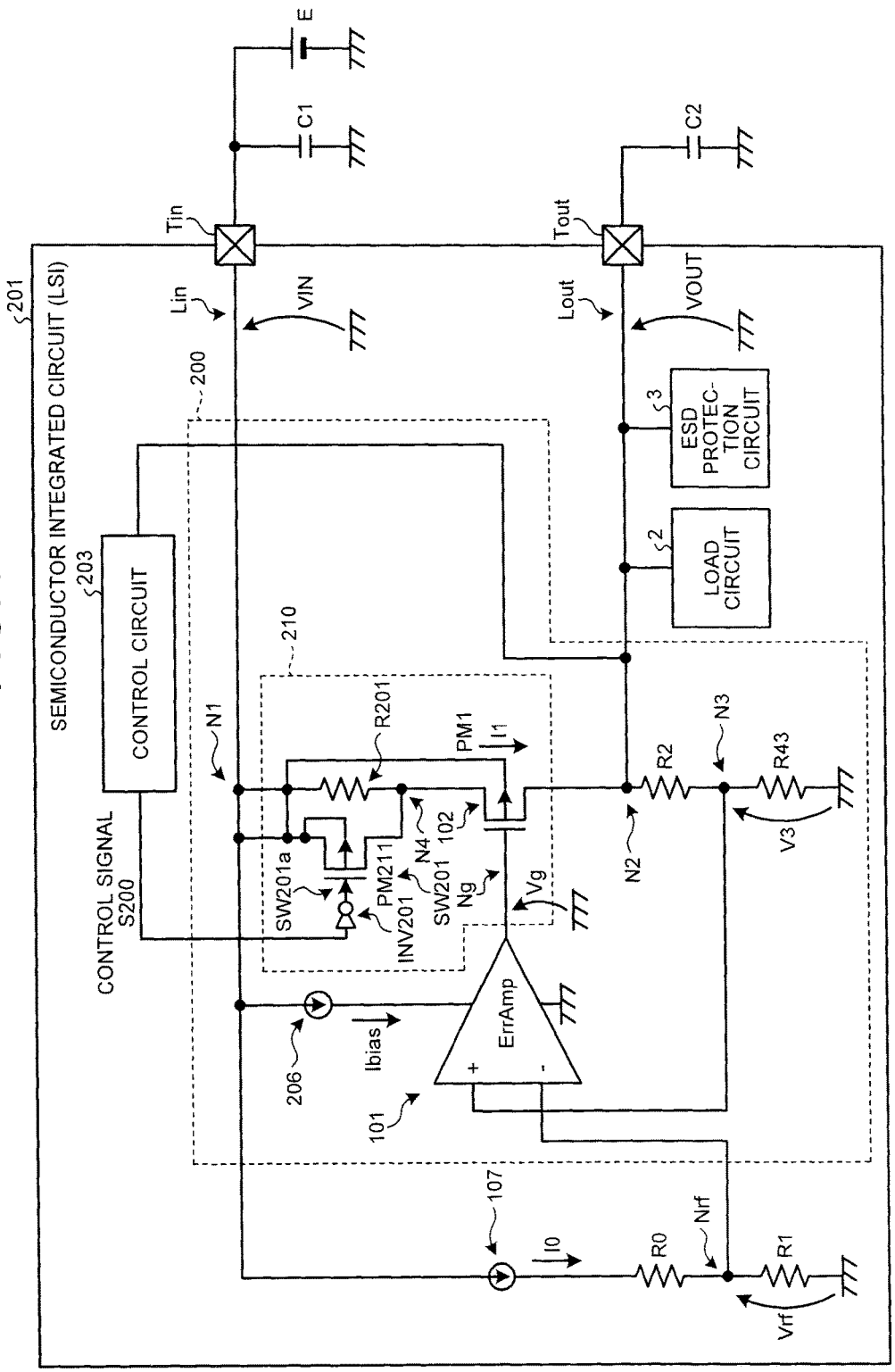
FIG. 4 is a circuit diagram showing the configuration of a semiconductor integrated circuit according to a second embodiment.

Specifically, the semiconductor integrated circuit 201 has a control circuit 203 and a regulator circuit 200 instead of the control circuit 103 and the regulator circuit 100 as shown in FIG. 4. The regulator circuit 200 has a constant current source 206 instead of the variable current source 106 and has an output circuit 210 including the output transistor 102. FIG. 4 is a circuit diagram showing the configuration of the semiconductor integrated circuit 201. The output circuit 210 is connected between the node N1 and the node N2. In the output circuit 210, the circuit resistance between the node N1 and the node N2 can be switched.

The control circuit 203 makes the circuit resistance of the output circuit 210 at startup higher than that of the output circuit 210 at steady operation. The control circuit 203 compares the voltage VOUT on the output terminal Tout and the threshold TH and controls the circuit resistance of the output circuit 210 according to the comparing result. If the voltage VOUT on the output terminal Tout is less than or equal to the threshold TH, the control circuit 203 controls the circuit resistance of the output circuit 210 to be at a first value. If the voltage VOUT on the output terminal Tout exceeds the threshold TH, the control circuit 203 controls the circuit resistance of the output circuit 210 to be at a second value. The second value is lower than the first value.

The output circuit 210 has the output transistor 102, a resistance element R201, a switch SW201, and an inverter INV201. The resistance element R201 is connected in series to the output transistor 102 between the node N1 and the node N2. The switch SW201 connects opposite ends of the resistance element R201. The output transistor 102 is connected between the node N4 and the node N2. The resistance element R201 and the switch SW201 are connected in parallel between the node N1 and the node N4. The inverter INV201 is connected between the control circuit 203 and the switch SW201 and inverts in logic a control signal S200 supplied from the control circuit 203 to supply to a control terminal SW201a of the switch SW201.

For example, the switch SW201 has a PMOS transistor PM211. The PMOS transistor PM211 has its source connected to the node N1 and its drain connected to the node N4. A control signal S200⁻ into which the control signal S200 is inverted in logic is supplied to the gate of the PMOS transistor PM211.

The control circuit 203 compares the voltage VOUT on the output terminal Tout and the threshold TH. The control circuit 203 supplies the control signal S200 according to the comparing result to the control terminal SW201a of the switch SW201 (the gate of the PMOS transistor PM211) via the inverter INV201, thereby controlling the on/off of the switch SW201. If the voltage VOUT on the output terminal Tout is less than or equal to the threshold TH, the control circuit 203 outputs the control signal S200 of the L level to control the switch SW201 to be off. If the voltage VOUT on the output terminal Tout exceeds the threshold TH, the control circuit 203 outputs the control signal S200 of the H level to control the switch SW201 to be on.

Figure 5:
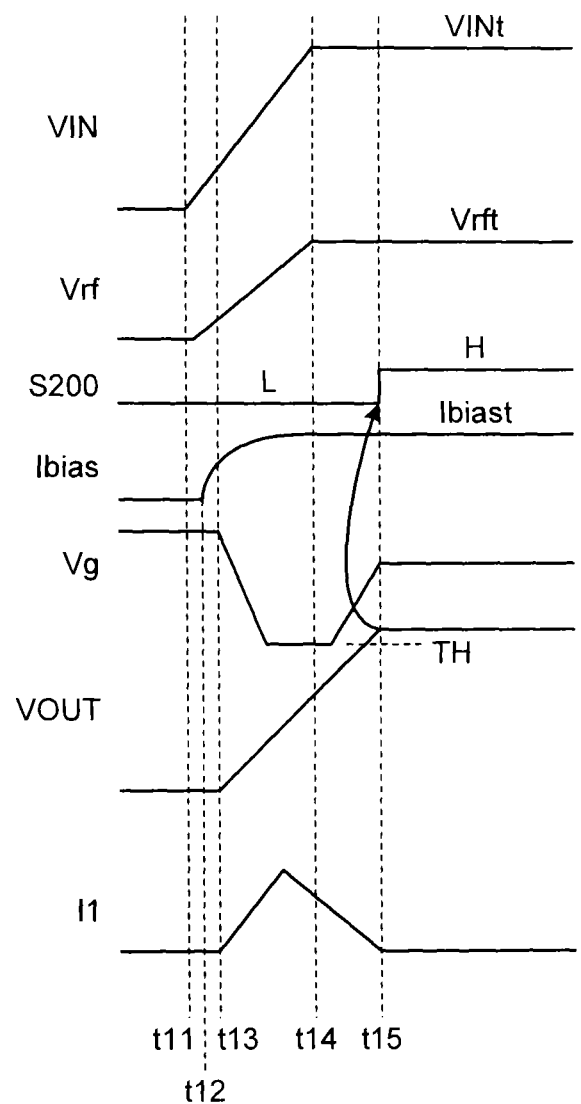
FIG. 5 is a waveform diagram showing the operation of the semiconductor integrated circuit according to the second embodiment.

For example, as shown in FIG. 5, the control circuit 203 controls the switch SW201 to be kept in an off state at the startup of the regulator circuit 200 and to be kept in an on state at steady operation. FIG. 5 is a waveform diagram showing the operation of the regulator circuit 200.

Immediately before timing t11, the control circuit 203 controls the control signal S200 to be at the L level (a bit value of 0). The inverter INV201 inverts in logic the control signal S200 of the L level received from the control circuit 203 to supply the control signal S200 of the H level to the control terminal SW201a of the switch SW201 (the gate of the PMOS transistor PM211). With this operation, the switch SW201 is kept in the off state.

At timing t11, the power supply E is connected to the input terminal Tin, so that the voltage VIN on the input line Lin starts rising. Accordingly, the reference voltage Vrf also starts rising.

At timing t12, in response to the voltage VIN on the input line Lin starting rising, the constant current source 206 starts operating.

At timing t13, the voltage Vg on the node Ng starts falling, and simultaneously the voltage VOUT on the output line Lout starts rising.

At this time, the control signal S200 is kept at the L level (a bit value of 0), and the switch SW201 is kept in the off state, so that the resistance element R201 is operative. Thus, the drain current I1 flowing through the output transistor 102 can be limited. Because the voltage VOUT on the output line Lout rises gently with a gradient determined by the time constant of the resistance element R201 and the capacitance element C2, the ESD protection circuit 3 can be prevented from turning on.

At timing t14, the voltage VIN on the input line Lin becomes stable being at a predetermined value VINt. Accordingly, the reference voltage Vrf becomes stable being at a predetermined value Vrft. The bias current Ibias supplied from the constant current source 206 to the error amplifier 101 becomes stable being at a value Ibiast.

At timing t15, the control circuit 203 detects that the voltage VOUT on the output line Lout exceeds the threshold TH and controls the control signal S200 to be at the H level (a bit value of 1) based on the detecting result. The inverter INV201 inverts in logic the control signal S200 of the H level received from the control circuit 203 to supply the control signal S200⁻ of the L level to the control terminal SW201a of the switch SW201. With this operation, the switch SW201 is turned on. Thus, the opposite ends of the resistance element R201 are short-circuited.

Thereafter, the control signal S200 is kept at the H level, so that the switch SW201 is kept in the on state. Thus, the circuit resistance between the node N1 and the node N2 becomes smaller than at startup, and hence it is possible to make the performance of the regulator circuit 200 at steady operation satisfy a required level.

As described above, in the second embodiment, in the semiconductor integrated circuit 201, the control circuit 203 makes the circuit resistance of the output circuit 210 at startup higher than that of the output circuit 210 at steady operation. Thus, at the startup of the regulator circuit 200, the drain current I1 of the output transistor 102 can be limited, and thus the rise gradient of the voltage VOUT on the output line Lout can be made gentle, so that the ESD protection circuit 3 can be prevented from turning on.

Further, in the second embodiment, in the semiconductor integrated circuit 201, the control circuit 203 controls the switch SW201 to be kept in the off state at the startup of the regulator circuit 200 and to be kept in the on state at steady operation. Thus, the resistance element R201 is inserted between the node N1 and the node N2 at startup, and the resistance element R201 is bypassed at steady operation, so that the circuit resistance of the output circuit 210 at startup can be made higher than that of the output circuit 210 at steady operation.

Figure 6:
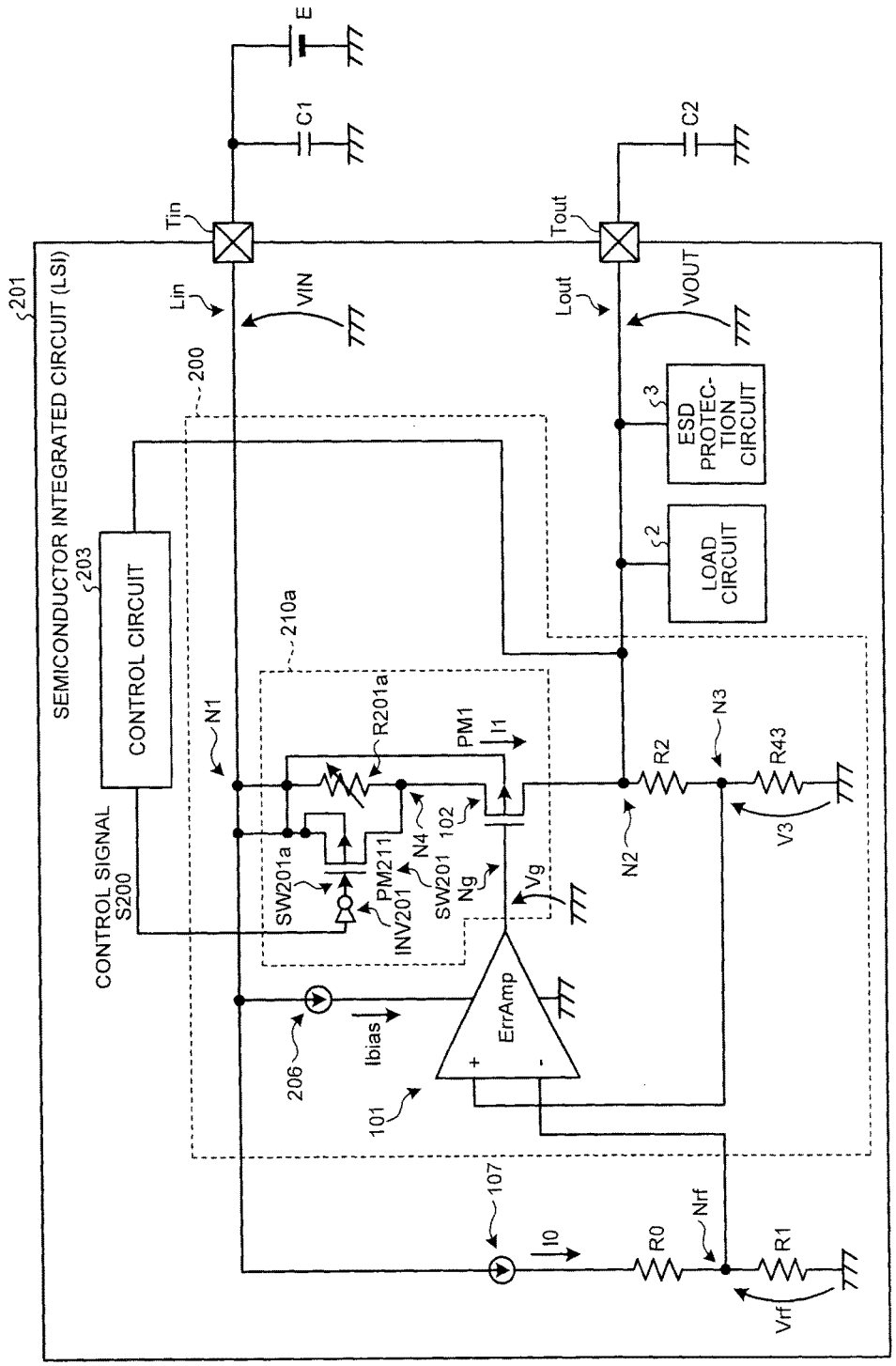
FIG. 6 is a circuit diagram showing the configuration of a semiconductor integrated circuit according to a modified example of the second embodiment.

Note that, as shown in FIG. 6, a resistance element R201a in an output circuit 210a may be a variable resistor. The resistance element R201a receives a control signal from, e.g., an external controller so that its resistance value is variable. In this case, even if the capacitance value of the capacitance element C2 varies, the time constant of the resistance element R201a and the capacitance element C2 can be made to approach a required level by changing the resistance value of the resistance element R201a, and hence the ESD protection circuit 3 can be reliably prevented from turning on at startup.

Third Embodiment

Next, a semiconductor integrated circuit 301 according to the third embodiment will be described. Description will be made below focusing on the differences from the second embodiment.

Whereas in the second embodiment the circuit resistance is made higher at startup by inserting the resistance element R201 to connect in series to the output transistor 102, in the third embodiment the circuit resistance is made higher at startup by rendering the output transistor 102 inoperative and connecting the resistance element R302 in parallel with it.

Figure 7:
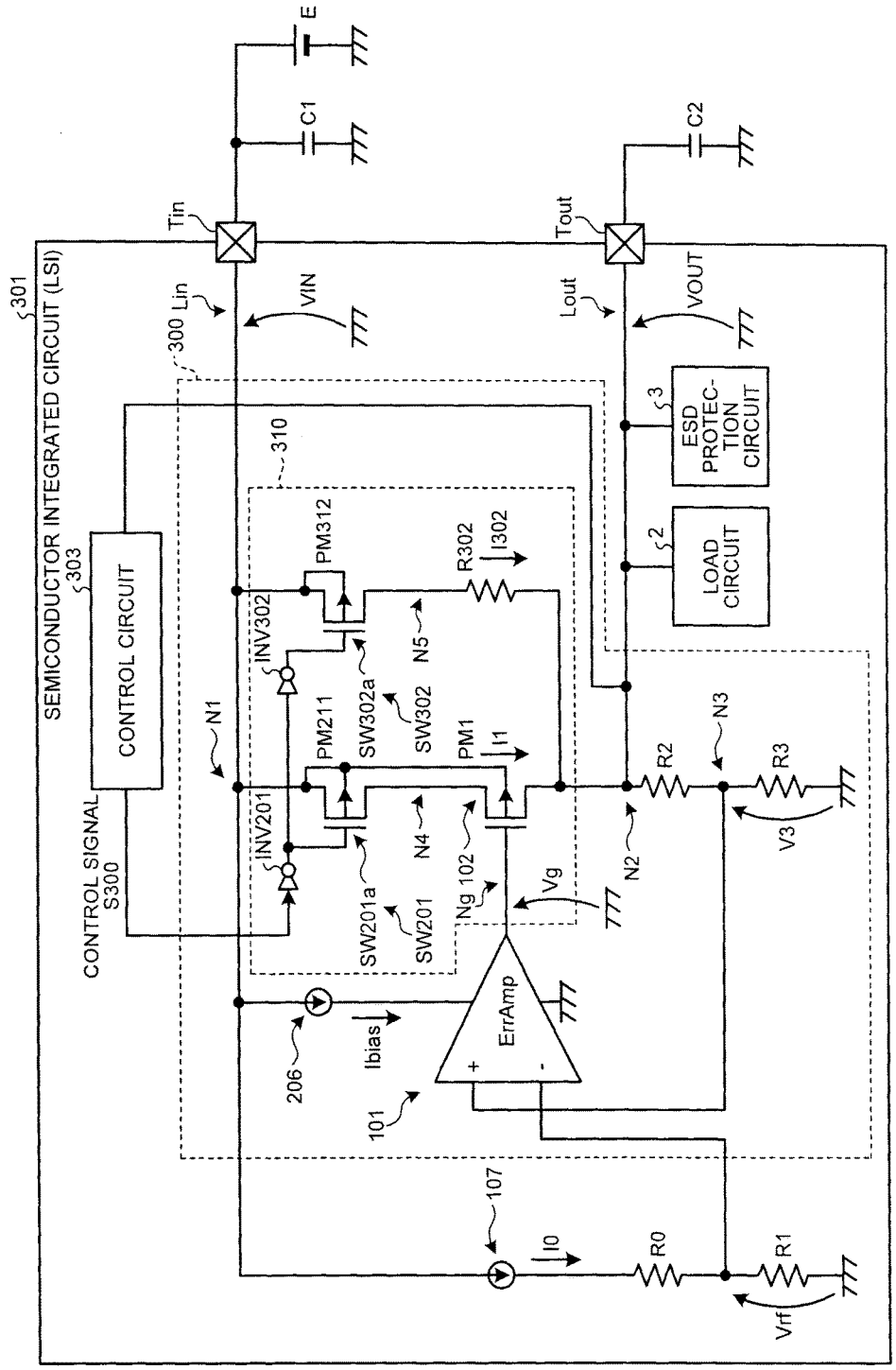
FIG. 7 is a circuit diagram showing the configuration of a semiconductor integrated circuit according to a third embodiment.

Specifically, the semiconductor integrated circuit 301 has a control circuit 303 and a regulator circuit 300 instead of the control circuit 203 and the regulator circuit 200 as shown in FIG. 7. The regulator circuit 300 has an output circuit 310 instead of the output circuit 210. FIG. 7 is a circuit diagram showing the configuration of the semiconductor integrated circuit 301.

The output circuit 310 has the output transistor 102, a resistance element R302, switches SW201, SW302, and inverters INV201, INV302. The resistance element R302 is connected in parallel with the output transistor 102 between the node N1 and the node N2. The switch SW201 is connected in series to the output transistor 102 between the node N1 and the node N2. The switch SW201 connects the node N1 and the node N4. The output transistor 102 is connected between the node N4 and the node N2. The switch SW302 is connected in series to the resistance element R302 between the node N1 and the node N2. The switch SW201 connects the node N1 and a node N5. The resistance element R302 is connected between the node N5 and the node N2. The inverter INV201 is connected between the control circuit 303 and the switch SW201 and inverts in logic a control signal S300 supplied from the control circuit 303 to supply to a control terminal SW201a of the switch SW201. The inverter INV302 is connected between the inverter INV201 and the switch SW302 and again inverts in logic a control signal logic-inverted by the inverter INV201 to supply to a control terminal SW302a of the switch SW302.

The resistance value of the resistance element R302 can be made sufficiently larger than the on resistance of the output transistor 102 (PMOS transistor PM1). By this means, the circuit resistance between the node N1 and the node N2 can be made higher effectively at startup.

The switch SW302 has a PMOS transistor PM312. The PMOS transistor PM312 has its source connected to the node N1 and its drain connected to the node N5. The control signal S300 is supplied to the gate of the PMOS transistor PM211. The control signal S300 is a control signal into which a control signal S300⁻ logic-inverted by the inverter INV201 is again logic-inverted by the inverter INV302.

The dimension (W/L, where W is the channel width and L is the channel length) of the PMOS transistor PM312 can be made smaller than that of the PMOS transistor PM211. With this arrangement, the circuit resistance between the node N1 and the node N2 can be made higher effectively at startup.

The control circuit 303 compares the voltage VOUT on the output terminal Tout and the threshold TH. The control circuit 303 outputs the control signal S300 according to the comparing result. Thus, the control circuit 303 controls the on/off of the switches SW201 and SW302. The control circuit 303 turns on/off the switches SW201 and SW302 complementarily. If the voltage VOUT on the output terminal Tout is less than or equal to the threshold TH, the control circuit 303 outputs the control signal S300 of the L level to control the switch SW201 to be off and the switch SW302 to be on. If the voltage VOUT on the output terminal Tout exceeds the threshold TH, the control circuit 303 outputs the control signal S300 of the H level to control the switch SW201 to be on and the switch SW302 to be off.

Figure 8:
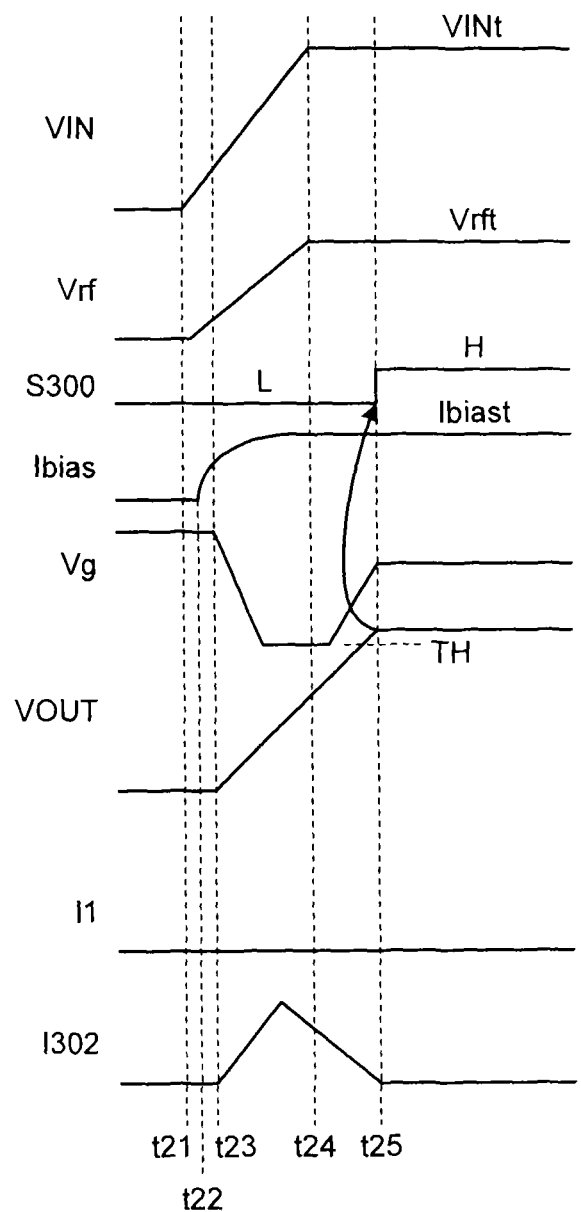
FIG. 8 is a waveform diagram showing the operation of the semiconductor integrated circuit according to the third embodiment.

For example, as shown in FIG. 8, the control circuit 303 controls the switches SW201, SW302 to be kept respectively in the off state and in the on state at the startup of the regulator circuit 300 and to be kept in the on state and in the off state at steady operation. FIG. 8 is a waveform diagram showing the operation of the regulator circuit 300.

Immediately before timing t21, the control circuit 303 controls the control signal S300 to be at the L level (a bit value of 0). The inverter INV201 inverts in logic the control signal S300 of the L level received from the control circuit 303 to supply the control signal S300⁻ of the H level to the control terminal SW201a of the switch SW201 (the gate of the PMOS transistor PM211). With this operation, the switch SW201 is kept in the off state. The inverter INV302 inverts in logic the control signal S300⁻ of the H level received from the inverter INV201 to supply the control signal S300 of the L level to the control terminal SW302a of the switch SW302 (the gate of the PMOS transistor PM312). By this means, the switch SW302 is kept in the on state.

At timing t21, the power supply E is connected to the input terminal Tin, so that the voltage VIN on the input line Lin starts rising. Accordingly, the reference voltage Vrf also starts rising.

At timing t22, in response to the voltage VIN on the input line Lin starting rising, the constant current source 206 starts operating.

At timing t23, the voltage Vg on the node Ng starts falling, and in parallel with this the voltage VOUT on the output line Lout starts rising.

At this time, the control signal S300 is kept at the L level (a bit value of 0), and the switch SW201 is kept in the off state while the switch SW302 is kept in the on state. Thus, the drain current I1 flowing through the output transistor 102 can be limited. Because the voltage VOUT on the output line Lout rises gently with a gradient determined by the time constant of the resistance element R302 and the capacitance element C2, the ESD protection circuit 3 can be prevented from turning on.

At timing t24, the voltage VIN on the input line Lin becomes stable being at a predetermined value VINt. Accordingly, the reference voltage Vrf becomes stable being at a predetermined value Vrft. The bias current Ibias supplied from the constant current source 206 to the error amplifier 101 becomes stable being at a value Ibiast.

At timing t25, the control circuit 303 detects that the voltage VOUT on the output line Lout exceeds the threshold TH and controls the control signal S300 to be at the H level (a bit value of 1) based on the detecting result. The inverter INV201 inverts in logic the control signal S300 of the H level received from the control circuit 303 to supply the control signal S300⁻ of the L level to the control terminal SW201a of the switch SW201. With this operation, the switch SW201 is turned on. The inverter INV302 inverts in logic the control signal S300 of the L level received from the inverter INV201 to supply the control signal S300 of the H level to the control terminal SW302a of the switch SW302 (the gate of the PMOS transistor PM312). With this operation, the switch SW302 is turned off.

Thereafter, the control signal S300 is kept at the H level, so that the switch SW201 is kept in the on state while the switch SW302 is kept in the off state. Thus, the circuit resistance between the node N1 and the node N2 becomes smaller than at startup, and hence it is possible to make the performance of the regulator circuit 300 at steady operation satisfy a required level.

As described above, in the third embodiment, in the semiconductor integrated circuit 301, the control circuit 303 controls the switches SW201, SW302 to be kept respectively in the off state and in the on state at the startup of the regulator circuit 300 and to be kept respectively in the on state and in the off state at steady operation. Thus, at startup the output transistor 102 can be rendered inoperative while the resistance element R302 is connected in parallel with it between the node N1 and the node N2, and at steady operation the output transistor 102 can be rendered operative while the resistance element R302 is rendered inoperative. As a result, the circuit resistance of the output circuit 310 at startup can be made higher than that of the output circuit 310 at steady operation.

Figure 9:
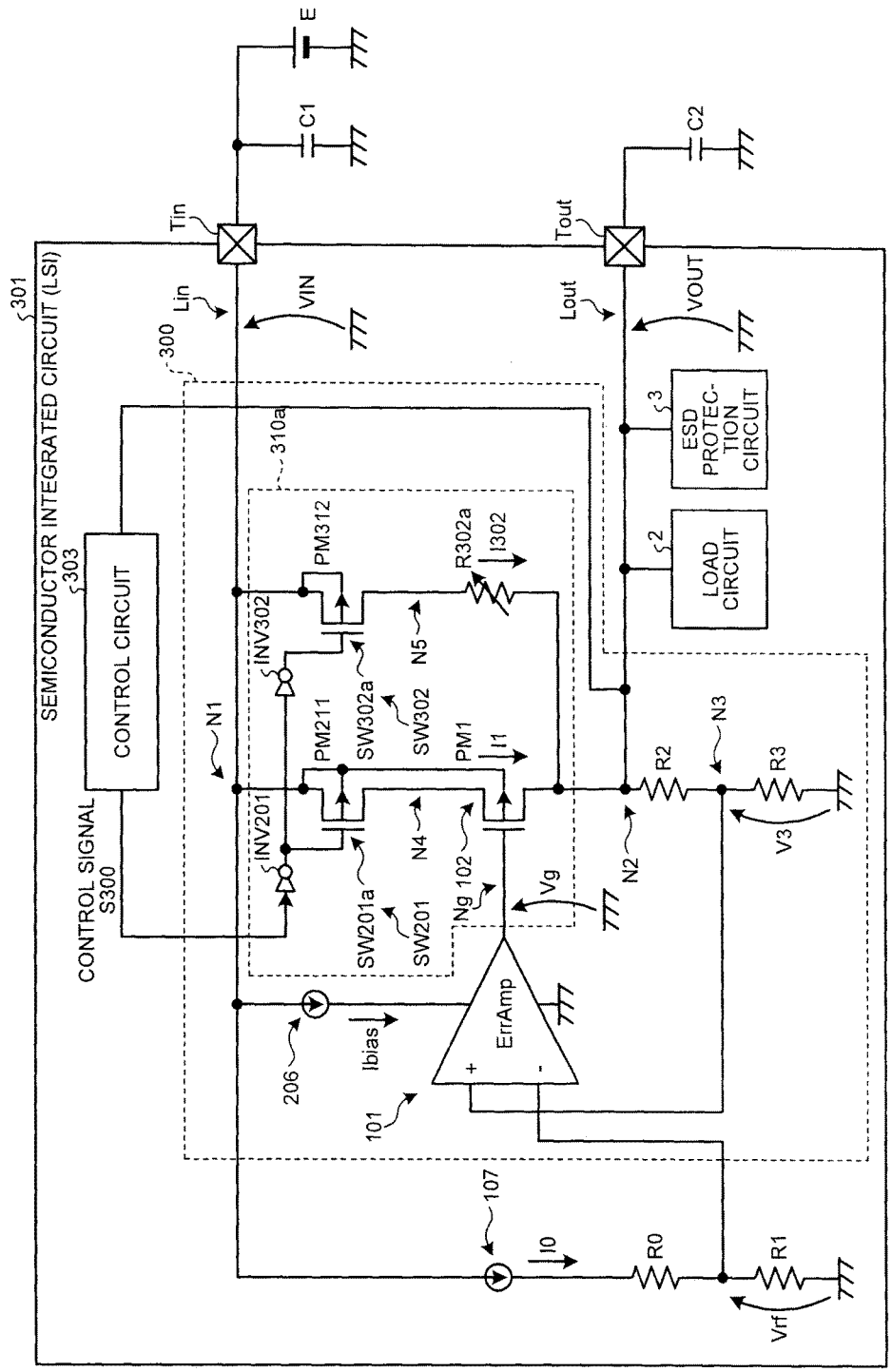
FIG. 9 is a circuit diagram showing the configuration of a semiconductor integrated circuit according to a modified example of the third embodiment.

Note that, as shown in FIG. 9, a resistance element R302$a$ in an output circuit 310$a$ may be a variable resistor. The resistance element R302$a$ receives a control signal from, e.g., an external controller so that its resistance value is variable. In this case, even if the capacitance value of the capacitance element C2 varies, the time constant of the resistance element R302$a$ and the capacitance element C2 can be made to approach a required level by changing the resistance value of the resistance element R302$a$, and hence the ESD protection circuit 3 can be reliably prevented from turning on at startup.

Fourth Embodiment

Next, a semiconductor integrated circuit 401 according to the fourth embodiment will be described. Description will be made below focusing on the differences from the second and third embodiments.

Whereas in the second and third embodiments the circuit resistance is made higher at startup by using a resistance element, in the fourth embodiment the circuit resistance is made higher by dividing in dimension the output transistor 102 to provide multiple output transistors and limiting the number of output transistors to be turned on at startup.

Figure 10:
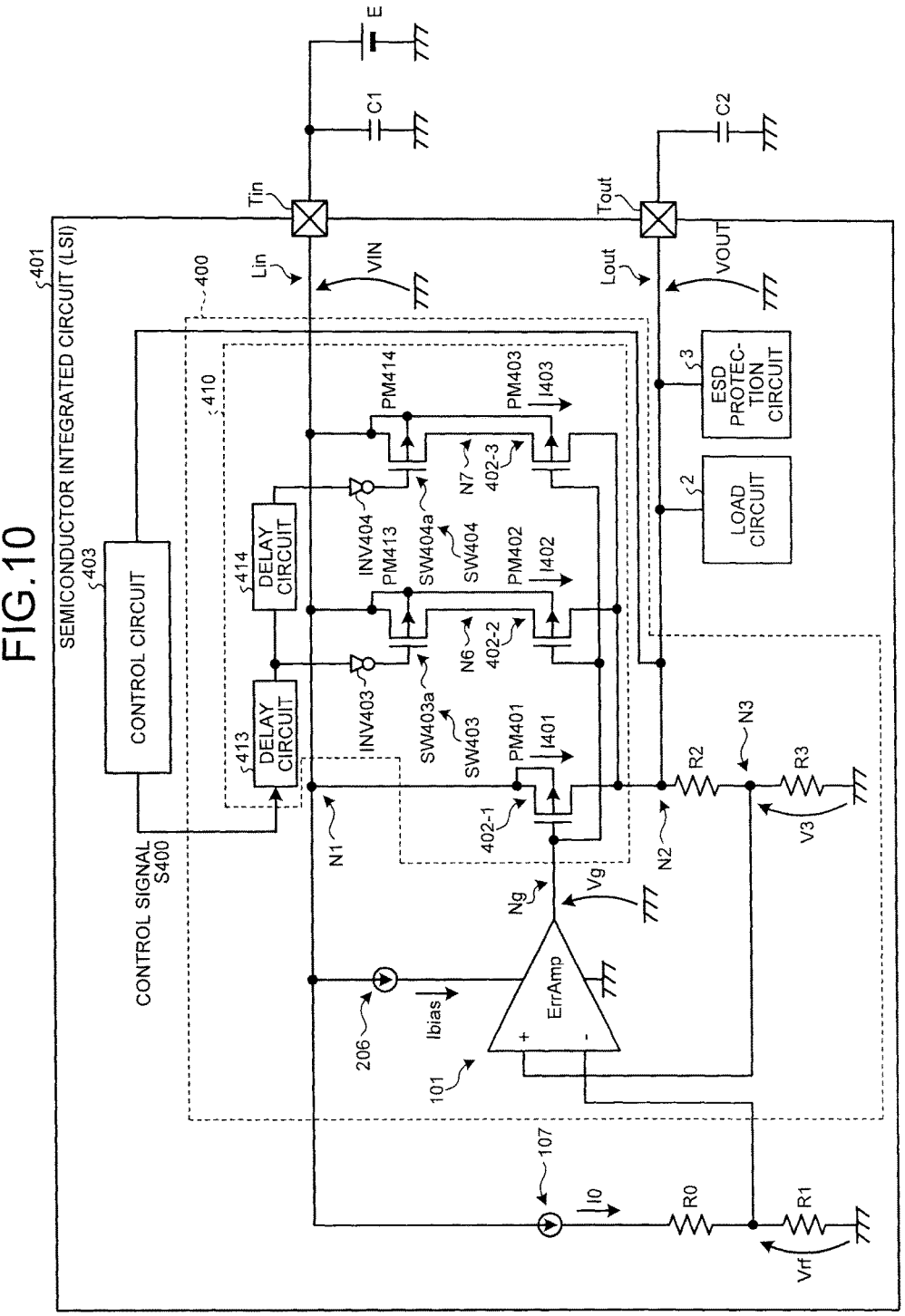
FIG. 10 is a circuit diagram showing the configuration of a semiconductor integrated circuit according to a fourth embodiment.

Specifically, the semiconductor integrated circuit 401 has a control circuit 403 and a regulator circuit 400 instead of the control circuit 203 and the regulator circuit 200 as shown in FIG. 10. The regulator circuit 400 has an output circuit 410 instead of the output circuit 210. FIG. 10 is a circuit diagram showing the configuration of the regulator circuit 400.

The output circuit 410 has output transistors 402-1 to 402-3, switches SW403, SW404, delay circuits 413, 414, and inverters INV403, INV404. The output transistors 402-1 to 402-3 are connected in parallel between the node N1 and the node N2. For example, the output transistor 402-1 has a PMOS transistor PM401. The output transistor 402-2 has a PMOS transistor PM402. The output transistor 402-3 has a PMOS transistor PM403.

Letting D1 be a dimension of the output transistor 102 of the second and third embodiments and D401, D402, D403 be dimensions of the output transistors 402-1, 402-2, 402-3 of the fourth embodiment, the equation 1 below holds. That is, the output transistor 102 of the second and third embodiments and the output transistors 402-1, 402-2, 402-3 of the fourth embodiment are substantially the same in circuit area. Thus, an increase in circuit area can be suppressed as compared with the second and third embodiments.

$$D401+D402+D403 \approx D1 \quad \text{formula 1}$$

The dimensions of the output transistors 402-1 to 402-3 are set to be increasingly larger in the order of the output transistors 402-1 to 402-3. That is, the following formula 2 holds for the dimensions of the output transistors 402-1 to 402-3.

$$D401<D402<D403 \quad \text{formula 2}$$

Hence, the following formula 3 holds for drain currents I401 to I403 respectively flowing through the output transistors 402-1 to 402-3 at steady operation.

$$I401<I402<I403 \quad \text{formula 3}$$

The switch SW403 is connected in series to the output transistor 402-2 between the node N1 and the node N2. The switch SW403 connects the node N1 and a node N6. The output transistor 402-2 is connected between the node N6 and the node N2. The switch SW404 is connected in series to the output transistor 402-3 between the node N1 and the node N2. The switch SW404 connects the node N1 and a node N7. The output transistor 402-3 is connected between the node N7 and the node N2.

In the output circuit 410, the delay circuits 413, 414 are provided to make timings at which the switches SW403 and SW404 turn on differ. The delay circuit 413 delays a control signal S400 supplied from the control circuit 403 to supply to the inverter INV403 and delay circuit 414. The delay circuit 414 delays the control signal S400 supplied from the delay circuit 413 to supply to the inverter INV404.

The inverter INV403 is connected between the delay circuit 413 and the switch SW403 and inverts in logic the control signal S400 supplied from the delay circuit 413 to supply to a control terminal SW403$a$ of the switch SW403. The inverter INV404 is connected between the delay circuit 414 and the switch SW404 and inverts in logic the control signal S400 supplied from the delay circuit 414 to supply to a control terminal SW404$a$ of the switch SW404.

The switch SW403 has a PMOS transistor PM413. The PMOS transistor PM413 has its source connected to the node N1 and its drain connected to the node N6. A control signal $S400^{-'}$ is supplied to the gate of the PMOS transistor PM413. The control signal $S400^{-'}$ is a control signal into which the control signal S400 supplied from the control circuit 403 is delayed by the delay circuit 413 and logic-inverted by the inverter INV403.

The switch SW404 has a PMOS transistor PM414. The PMOS transistor PM414 has its source connected to the node N1 and its drain connected to the node N7. A control signal $S400^{-''}$ is supplied to the gate of the PMOS transistor PM414. The control signal $S400^{-''}$ is a control signal into which the control signal S400 supplied from the control circuit 403 is delayed by the delay circuits 413, 414 and logic-inverted by the inverter INV404.

The control circuit 403 compares the voltage VOUT on the output terminal Tout and the threshold TH. The control circuit 403 outputs the control signal S400 according to the comparing result. Thus, the control circuit 403 controls the on/off of each of the switches SW403 and SW404. If the voltage VOUT on the output terminal Tout is less than or equal to the threshold TH, the control circuit 403 outputs the control signal S400 of the L level to control the switches SW403, SW404 to be off. If the voltage VOUT on the output terminal Tout exceeds the threshold TH, the control circuit 403 outputs the control signal S400 of the H level to, a predetermined delay time later, control the switches SW403, SW404 sequentially to be on.

For example, as shown in FIG. 11, the control circuit 403 controls each of the switches SW403, SW404 to be kept in the off state at the startup of the regulator circuit 400 and to be kept in the on state a predetermined delay time later at steady operation. FIG. 11 is a waveform diagram showing the operation of the regulator circuit 400.

Immediately before timing t31, the control circuit 403 controls the control signal S400 to be at the L level (a bit value of 0). The delay circuit 413 delays the control signal S400 of the L level received from the control circuit 403 to supply a delayed control signal S400' to the inverter INV403. The inverter INV403 inverts in logic the control signal S400' of the L level outputted from the delay circuit 413 to supply the control signal S400$^{-\prime}$ of the H level to the control terminal SW403a of the switch SW403 (the gate of the PMOS transistor PM413). With this operation, the switch SW403 is kept in the off state. The delay circuit 414 further delays the control signal S400' of the L level received from the delay circuit 413 to supply a delayed control signal S400" to the inverter INV404. The inverter INV404 inverts in logic the control signal S400" of the L level outputted from the delay circuit 414 to supply the control signal S400$^{-\prime\prime}$ of the H level to the control terminal SW404a of the switch SW404 (the gate of the PMOS transistor PM414). With this operation, the switch SW404 is kept in the off state.

At timing t31, the power supply E is connected to the input terminal Tin, so that the voltage VIN on the input line Lin starts rising. Accordingly, the reference voltage Vrf also starts rising.

At timing t32, in response to the voltage VIN on the input line Lin starting rising, the constant current source 206 starts operating.

At timing t33, the voltage Vg on the node Ng starts falling, and simultaneously the voltage VOUT on the output line Lout starts rising.

At this time, the control signal S400 is kept at the L level (a bit value of 0), and the switches SW403, SW404 are both kept in the off state. Thus, from among the output transistors 402-1 to 402-3, transistors to be turned on can be limited to the output transistor 402-1, and thus the drain current I401 flowing between the node N1 and the node N2 can be limited. Because the voltage VOUT on the output line Lout rises gently with a gradient determined by the time constant of the on resistance of the output transistor 402-1 and the capacitance element C2, the ESD protection circuit 3 can be prevented from turning on.

At timing t34, the voltage VIN on the input line Lin becomes stable being at a predetermined value VINt. Accordingly, the reference voltage Vrf becomes stable being at a predetermined value Vrft. The bias current Ibias supplied from the constant current source 206 to the error amplifier 101 becomes stable being at a value Ibiast.

At timing t35, the control circuit 403 detects that the voltage VOUT on the output line Lout exceeds the threshold TH and controls the control signal S400 to be at the H level (a bit value of 1) based on the detecting result.

The delay circuit 413 delays the control signal S400 of the H level received from the control circuit 403 to supply the delayed control signal S400' to the inverter INV403. The inverter INV403 inverts in logic the control signal S400' of the H level outputted from the delay circuit 413 to supply the control signal S400$^{-\prime}$ of the L level to the control terminal SW403a of the switch SW403 (the gate of the PMOS transistor PM413). With this operation, the switch SW403 is turned on at a timing the delay time of the delay circuit 413 after timing t35.

The delay circuit 414 further delays the control signal S400' of the H level received from the delay circuit 413 to supply the delayed control signal S400" to the inverter INV404. The inverter INV404 inverts in logic the control signal S400" of the H level outputted from the delay circuit 414 to supply the control signal S400$^{-\prime\prime}$ of the L level to the control terminal SW404a of the switch SW404 (the gate of the PMOS transistor PM414). With this operation, the switch SW404 is turned on at a timing "the delay time of the delay circuit 413"+"the delay time of the delay circuit 414" after timing t35.

Thereafter, the control signal S400 is kept at the H level, so that the switch SW403 is kept in the on state and that the switch SW404 is kept in the on state. Thus, the circuit resistance between the node N1 and the node N2 becomes smaller than at startup, and hence it is possible to make the performance of the regulator circuit 400 at steady operation satisfy a required level.

As described above, in the fourth embodiment, in the semiconductor integrated circuit 401, the control circuit 403 controls each of the switches SW403, SW404 to be kept in the off state at the startup of the regulator circuit 400 and to be kept in the on state a predetermined delay time later at steady operation. Thus, the number of output transistors to be turned on at startup can be limited, so that the circuit resistance of the output circuit 410 at startup can be made higher than that of the output circuit 410 at steady operation.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A semiconductor integrated circuit comprising:
an output transistor connected between a first node on an input terminal side and a second node on an output terminal side;
an error amplifier that has a non-inverting input terminal, an inverting input terminal, and an output terminal, the non-inverting input terminal being connected to a third node between the second node and a standard potential, the inverting input terminal being connected to a reference voltage, the output terminal being connected to a gate of the output transistor; and
a control circuit that makes responsiveness of the error amplifier at startup slower than responsiveness of the error amplifier at steady operation,
wherein the control circuit compares the voltage on the output terminal and a threshold and controls the responsiveness of the error amplifier according to a comparison result, and
wherein if the voltage on the output terminal is less than or equal to the threshold, the control circuit controls the responsiveness of the error amplifier to be at first responsiveness and, if the voltage on the output terminal exceeds the threshold, controls the responsiveness of the error amplifier to be at second responsiveness faster than the first responsiveness.

2. The semiconductor integrated circuit according to claim 1, further comprising:
a variable current source connected to the error amplifier, wherein the control circuit makes a current supplied from the variable current source to the error amplifier at startup smaller than a current supplied from the variable current source to the error amplifier at steady operation.

3. The semiconductor integrated circuit according to claim 1, further comprising:
a variable current source connected to the error amplifier,
wherein the control circuit compares the voltage on the output terminal and a threshold and controls the variable current source according to a comparison result.

4. The semiconductor integrated circuit according to claim 3, wherein if the voltage on the output terminal is less than or equal to the threshold, the control circuit controls the value of the current supplied from the variable current source to the error amplifier to be at a first value and, if the voltage on the output terminal exceeds the threshold, controls the value of the current supplied from the variable current source to the error amplifier to be at a second value greater than the first value.

5. A semiconductor integrated circuit comprising:
an output circuit connected between a first node on an input terminal side and a second node on an output terminal side, circuit resistance between the first node and the second node being able to be switched;
an error amplifier that has a non-inverting input terminal, an inverting input terminal, and an output terminal, the non-inverting input terminal being connected to a third node between the second node and a standard potential, the inverting input terminal being connected to a reference voltage, and the output terminal being connected to the output circuit; and
a control circuit that makes circuit resistance of the output circuit at startup higher than circuit resistance of the output circuit at steady operation,
wherein the control circuit compares the voltage on the output terminal and a threshold and controls the circuit resistance of the output circuit according to a comparison result, and
wherein if the voltage on the output terminal is less than or equal to the threshold, the control circuit controls the circuit resistance of the output circuit to be at a first value and, if the voltage on the output terminal exceeds the threshold, controls the circuit resistance of the output circuit to be at a second value lower than the first value.

6. A semiconductor integrated circuit comprising:
an output circuit connected between a first node on an input terminal side and a second node on an output terminal side, circuit resistance between the first node and the second node being able to be switched;
an error amplifier that has a non-inverting input terminal, an inverting input terminal, and an output terminal, the non-inverting input terminal being connected to a third node between the second node and a standard potential, the inverting input terminal being connected to a reference voltage, and the output terminal being connected to the output circuit; and
a control circuit that makes circuit resistance of the output circuit at startup higher than circuit resistance of the output circuit at steady operation,
wherein the output circuit has:
an output transistor connected between the first node and the second node;
a first resistor connected in series to the output transistor between the first node and the second node; and
a first switch connecting opposite ends of the first resistor, and
wherein the control circuit compares the voltage on the output terminal and a threshold and controls the on/off of the first switch according to a comparison result.

7. The semiconductor integrated circuit according to claim 6, wherein if the voltage on the output terminal is less than or equal to the threshold, the control circuit controls the first switch to be off and, if the voltage on the output terminal exceeds the threshold, controls the first switch to be on.

8. The semiconductor integrated circuit according to claim 6, wherein the first resistor is a variable resistor.

9. The semiconductor integrated circuit according to claim 5,
wherein the output circuit has:
an output transistor connected between the first node and the second node;
a first switch connected in series to the output transistor between the first node and the second node;
a second resistor connected in parallel with the output transistor between the first node and the second node; and
a second switch connected in series to the second resistor between the first node and the second node, and
wherein the control circuit compares the voltage on the output terminal and the threshold and controls the on/off of each of the first switch and the second switch according to the comparison result.

10. The semiconductor integrated circuit according to claim 9, wherein if the voltage on the output terminal is less than or equal to the threshold, the control circuit controls the first switch to be off and the second switch to be on and, if the voltage on the output terminal exceeds the threshold, controls the first switch to be on and the second switch to be off.

11. The semiconductor integrated circuit according to claim 9, wherein the second resistor is a variable resistor.

12. The semiconductor integrated circuit according to claim 5,
wherein the output circuit has:
a first output transistor connected between the first node and the second node;
a second output transistor connected in parallel with the first output transistor between the first node and the second node; and
a third switch connected in series to the second output transistor between the first node and the second node, and
wherein the control circuit compares the voltage on the output terminal and the threshold and controls the on/off of the third switch according to the comparison result.

13. The semiconductor integrated circuit according to claim 12, wherein if the voltage on the output terminal is less than or equal to the threshold, the control circuit controls the third switch to be off and, if the voltage on the output terminal exceeds the threshold, controls the third switch to be on.

14. The semiconductor integrated circuit according to claim 12, wherein a dimension of the first output transistor is smaller than a dimension of the second output transistor.

15. The semiconductor integrated circuit according to claim 1, wherein an ESD (Electrostatic Discharge) protection circuit is connected to an output line, the output line connecting the second node and the output terminal.

16. The semiconductor integrated circuit according to claim 5, wherein an ESD (Electrostatic Discharge) protection circuit is connected to an output line connecting the second node and the output terminal.

17. The semiconductor integrated circuit according to claim 12, wherein an ESD (Electrostatic Discharge) protection circuit is connected to an output line connecting the second node and the output terminal.

* * * * *